No. 701,969. Patented June 10, 1902.
J. C. VAN ARSDELL.
END SUPPORT FOR SPIRAL CONVEYERS.
(Application filed Dec. 17, 1901.)

(No Model.)

Witnesses:—
C. H. Wimberly
W. Waller

Inventor,
J. C. Van Arsdell,
By A. L. Jackson,
Attorney.

THE NORRIS PETERS CO., PHOTO-LITHO., WASHINGTON, D. C.

UNITED STATES PATENT OFFICE.

JOHN C. VAN ARSDELL, OF DALLAS, TEXAS.

END SUPPORT FOR SPIRAL CONVEYERS.

SPECIFICATION forming part of Letters Patent No. 701,969, dated June 10, 1902.

Application filed December 17, 1901. Serial No. 86,307. (No model.)

*To all whom it may concern:*

Be it known that I, JOHN C. VAN ARSDELL, a citizen of the United States, residing at Dallas, in the county of Dallas and State of Texas, have invented certain new and useful Improvements in End Supports for Spiral Conveyers, of which the following is a specification.

This invention relates to improvements in spiral conveyers, and more particularly to end supports for the flights or to means for securing the flights to the shafts of the conveyers; and the object is to construct devices for clamping the shafts and to be riveted to the flights in such manner as to be firm supports for the ends of the flights and to be compact, with no abrupt shoulders to obstruct the passage of material that is going through the conveyer.

Other objects and advantages will be fully understood from the following description, and the invention will be more particularly pointed out in the claims.

Reference is had to the accompanying drawings, forming a part of this application and specification.

Figure 1:
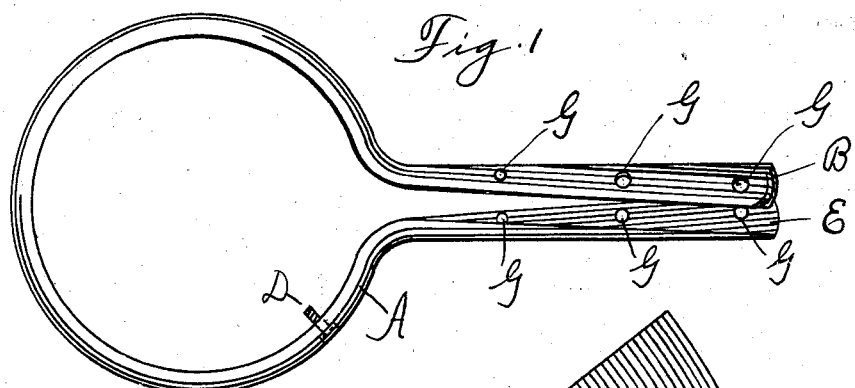
Figure 2:
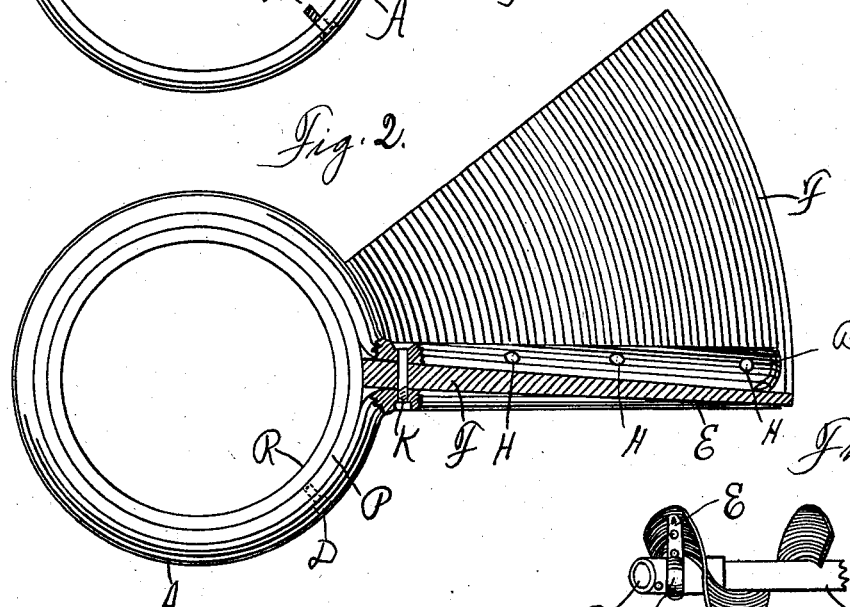
Figure 3:
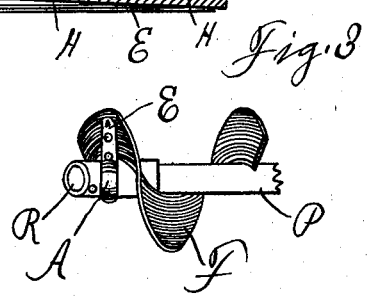
Figure 4:

Figure 1 is a side elevation of an end support constructed according to my invention. Fig. 2 is a similar view of the support attached to the shaft and engaging a section of a flight, the end of the shaft being shown. Fig. 3 is a perspective view of the end of a shaft and flight, showing the flight secured to the shaft by the improved support. Fig. 4 is a cross-section of the clamp.

Similar characters of reference are used to indicate the same parts throughout the several views.

It is customary to secure the flights to the shafts only at the ends for ordinary purposes, and for this reason I have called my improvement "end supports." For very heavy work the flights are attached to the shafts at the ends and at points intermediate the ends. My improved support may be used at any point, as it is so constructed that it will not interfere with the passage of material, and it will not weaken the shaft, because no rivet or bolt holes have to be made in the shaft.

My improved support consists of a clamp A, having the extended arms B and E for engaging the flight F. The arms B and E are provided with several bolt-holes or rivet-holes G, through which bolts may be passed for securing the arms to the flights. The flights must have holes registering with the holes G for the passage of the bolts. The heads of the bolts H are all countersunk in the arms B or E, and the riveted portions of the ends of the bolts are also countersunk in the arm E or B, just as the head and the nut of the bolt K is countersunk in these arms. A portion of each arm B and E is broken away to show how the parts of the bolt K are countersunk therein. The bolt K is used to tighten the clamp or collar A on the shaft P or the collar R. The collar R is for strengthening the conveyer-pipe shaft-couplings. In the conveyers in use some have this collar on the outside and some have this collar on the inside of the pipe-shaft couplings. This is why the statement previous to the last above was made. The act of clamping with the bolt K makes the work or function of my improved clamp similar to a hose-clamp, and the shaft is not weakened by having holes made therein. The arms B and E may be made heavier at the point at which the bolt K passes through. The nut on the bolt K may be countersunk in the arm E, so that the nut will not obstruct the passage of material. The set-screw D extends through only one wall of the pipe-shaft and has the head thereof countersunk in the clamp A.

The supports are to be made in various sizes to suit the conveyers on which they are to be used. The arms B and E can be adapted to flights of any pitch, and the clamp may be adapted to engage a shaft of any diameter. For variations of the pitch of the flights it will be necessary only to twist the arms B and E more or less.

The spiral conveyers now in use have the flights secured to the shafts by means of lugs, which are screwed into the shafts and then riveted to the flights.

The advantage of my improvements will be readily understood. There are no holes to be made in the shafts, and the clamps engage the shafts and are tightened thereon, drawing the flights against the shafts, and thereby making the flights more rigid with the shafts. At the same time the shape of the clamp does not cause any material obstruction to the passage of the material through the conveyer.

Having fully described my improved support, what I claim as new, and desire to secure by Letters Patent, is—

1. A clamp for supporting the flights of spiral conveyers having a body portion for engaging the shaft of the conveyer and having arms to be riveted to the flight and means for tightening the said body portion on said shaft and drawing said flight against said shaft.

2. A clamp for supporting the flights of spiral conveyers having a body portion for engaging the shaft of the conveyer, arms to be riveted to the flight, a bolt for tightening said body portion on said shaft and drawing the flight against said shaft, and a set-screw for preventing the said body portion from sliding on said shaft.

In testimony whereof I set my hand, in the presence of two witnesses, this 11th day of December, 1901.

JOHN C. VAN ARSDELL.

Witnesses:
A. L. JACKSON,
J. W. STITT.